(12) United States Patent
Sasano et al.

(10) Patent No.: US 6,516,906 B2
(45) Date of Patent: Feb. 11, 2003

(54) VEHICLE FRONT END PANEL

(75) Inventors: Norihisa Sasano, Ama-gun (JP); Ikuo Ozawa, Toyoake (JP); Noriaki Maeda, Kariya (JP); Toshiki Sugiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/773,869

(22) Filed: Feb. 1, 2001

(65) Prior Publication Data

US 2001/0011614 A1 Aug. 9, 2001

(30) Foreign Application Priority Data

Feb. 3, 2000 (JP) .......................................... 2000-032615

(51) Int. Cl.[7] .............................. B60K 11/04; F28D 1/00
(52) U.S. Cl. ................................ 180/68.4; 296/203.02; 165/149
(58) Field of Search .............................. 180/68.4, 68.6; 296/194, 203.02; 165/149, 121; 123/41.51

(56) References Cited

U.S. PATENT DOCUMENTS

| | | | | |
|---|---|---|---|---|
| 4,367,793 A | * | 1/1983 | MacIntosh | 165/151 |
| 4,742,881 A | * | 5/1988 | Kawaguchi et al. | 180/68.4 |
| 4,809,773 A | * | 3/1989 | Susa et al. | 165/104.32 |
| 5,123,695 A | * | 6/1992 | Kanemitsu et al. | 296/194 |
| 5,271,473 A | * | 12/1993 | Ikeda et al. | 180/68.4 |
| 5,658,041 A | * | 8/1997 | Girardot et al. | 296/194 |
| 6,155,335 A | * | 12/2000 | Acre et al. | 165/41 |
| 6,196,624 B1 | * | 3/2001 | Bierjon et al. | 296/203.02 |
| 6,216,810 B1 | * | 4/2001 | Nakai et al. | 180/68.4 |
| 6,324,759 B1 | * | 12/2001 | Sasano et al. | 29/890.03 |

* cited by examiner

Primary Examiner—Brian L. Johnson
Assistant Examiner—Jeffrey J. Restifo
(74) Attorney, Agent, or Firm—Harness, Dickey & Pierce, PLC

(57) ABSTRACT

In a vehicle front end panel to which a front end member including at least a radiator is assembled, a water filling port for introducing water into the radiator is integrally formed with an upper beam of a panel body portion on a vehicle rear side of the upper beam. The water filling port is coupled with the radiator through a panel joint portion having an opening opened toward a vehicle front side, and the panel joint portion is formed integrally with the panel body portion. Accordingly, the radiator can be readily assembled to the panel body portion of the front end panel, and vehicle assembling performance can be improved.

14 Claims, 5 Drawing Sheets

VEHICLE FRONT END PANEL

CROSS-REFERENCE TO RELATED APPLICATION

This application is related to and claims priority from Japanese Patent Application No. 2000-32615 filed on Feb. 3, 2000, the contents of which are hereby incorporated by reference.

BACKGROUND OF THE INVENTION

1. Field of the Invention

The present invention relates to a front end panel fixed to a vehicle body at a vehicle front end side, to which front end components including at least a radiator are readily assembled.

2. Description of Related Art

In a front end panel structure of a vehicle, after front end components such as a radiator, a condenser and a blower are assembled to a front end panel, the front end panel is further assembled to the vehicle, for reducing assembling steps of the vehicle. However, the radiator is provided with a water filling port for introducing water, and it is necessary for the water filling port to be positioned at a vehicle rear side of the front end panel for a maintenance of the radiator. In this case, it is difficult to assemble the radiator to the front end panel, and vehicle assembling performance may be deteriorated.

SUMMARY OF THE INVENTION

In view of the foregoing problems, it is an object of the present invention to improve assembling performance for assembling a vehicle front end member including at least a radiator to a front end panel.

According to the present invention, in a front end panel being assembled to a vehicle body at a vehicle front side, a front end member including at least a radiator is assembled to a panel body portion made of resin, and a water filling port for introducing water into the radiator is provided integrally with the panel body portion at a vehicle rear side of the panel body portion. Because the water filling port for the radiator is provided integrally with the panel body portion, the radiator can be readily assembled to the panel body portion without inserting the water filling port into a rear side part of the panel body portion.

Preferably, the water filling port is coupled with the radiator through a panel joint portion, and the panel joint portion is provided integrally with the panel body portion at a vehicle rear side of the panel body portion. Further, the panel joint portion has an opening opened toward a vehicle front side. Accordingly, the radiator can be readily accurately assembled to the front end panel through the opening of the panel joint portion.

More preferably, the radiator has a radiator joint portion being connected to the panel joint portion, and the radiator joint portion has an opening opened toward a vehicle rear side to face the opening of the panel joint portion. Therefore, the radiator can be readily accurately assembled to the front end panel through the radiator joint portion and the panel joint portion.

On the other hand, the front end panel further includes a reserve tank which absorbs a change of a water amount within the radiator, and a communication passage through which the reserve tank and the water filling port communicate with each other. In addition, the receiver and the communication passage are formed integrally with the panel body portion. Accordingly, an assembling step for assembling the reserve tank to the front end panel is not necessary.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–3. In the first embodiment, the present invention is typically applied to a vehicle where a radiator for cooling engine-coolant, a condenser of a refrigerant cycle, and a blower unit for blowing cooling air toward the radiator and the condenser are mounted on a vehicle front end portion.

Figure 1:
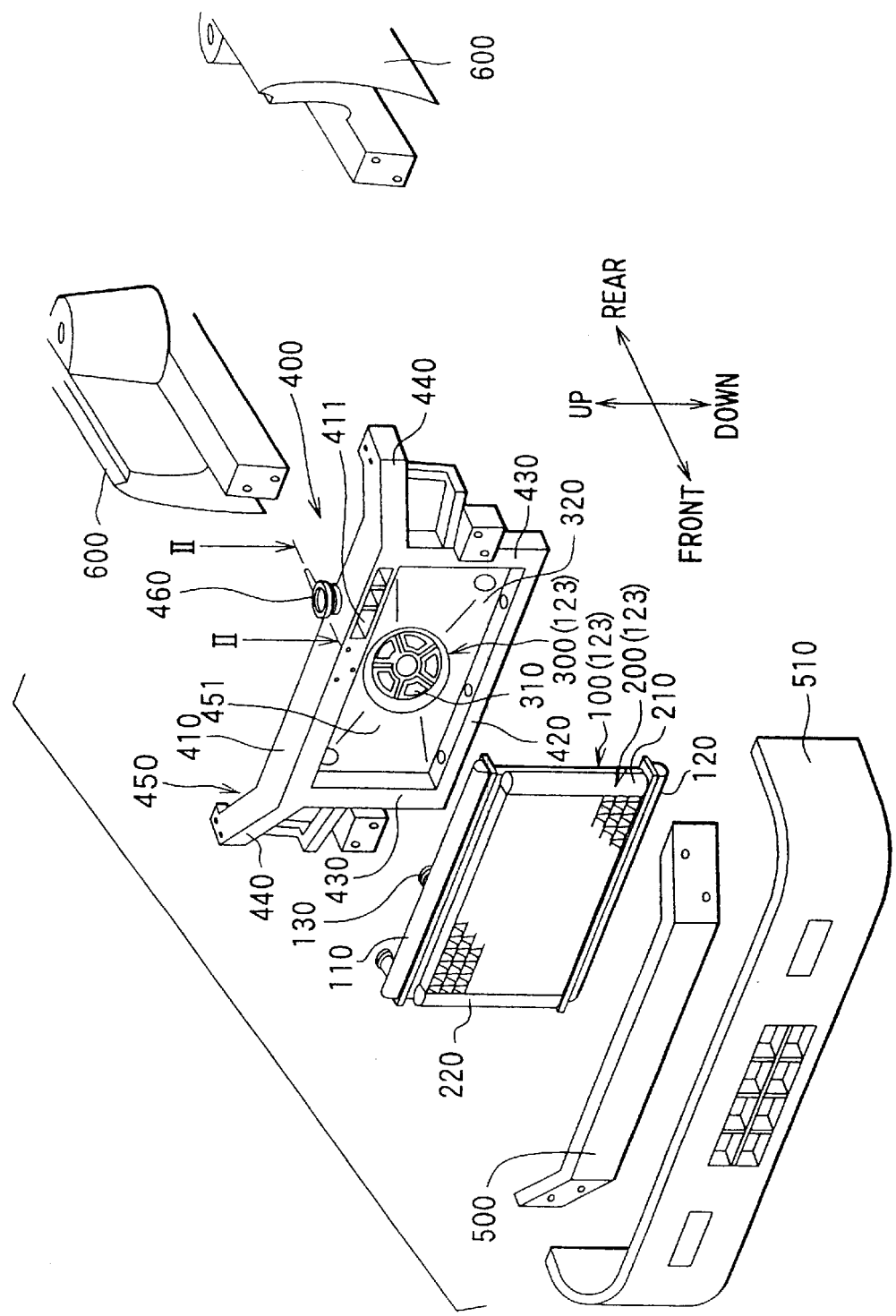
FIG. 1 is a disassembled perspective view of a vehicle front end structure with a front end panel according to a first preferred embodiment of the present invention.

As shown in FIG. 1, a radiator 100 is disposed at a vehicle rear side of a condenser 200, and a blower unit 300 for blowing air toward the radiator 100 and the condenser 200 is disposed at a vehicle rear side of the radiator 100. The blower unit 300 includes an axial flow fan 310, and a shroud 320 for holding the axial flow fan 310 and for closing a clearance between the radiator 100 and the axial flow fan 310. In the first embodiment, front end components such as the radiator 100, the condenser 200 and the blower unit 300 are referred to as "front end member 123".

The radiator 100 includes a radiator core having plural radiator tubes through which coolant flows, and both radiator tanks 110, 120 connected to both ends of each radiator tube in a longitudinal direction of the radiator tubes to communicate with each radiator tube. In the first embodiment, a radiator joint portion 130 of the radiator 100 is disposed to be connected to a panel joint portion 470 for a water-filling. As shown in FIG. 2, the radiator joint portion 130 of the radiator 100 has an opening 130a opened toward a vehicle rear side. The radiator tanks 110, 120 are made of resin, and the radiator joint portion 130 is integrally formed with the radiator tank 110 by using a resin.

The condenser 200 includes a condenser core having plural condenser tubes through which refrigerant flows, and both condenser tanks 210, 220 connected to both ends of each condenser tube in a longitudinal direction of the condenser tubes to communicate with each condenser tube.

The front end member 123 including at least the radiator 100, the condenser 200 and the blower unit 300 is assembled to a panel body portion 450 of a front end panel 400 made of resin (e.g., a polypropylene resin with a glass fiber). The panel body portion 450 of the front end panel 400 includes a bracket portion 440, an upper beam 410 provided at an upper side to extend in a horizontal direction, a lower beam 420 provided at a lower side to extend in the horizontal direction, and both right and left supporting pillars 430 extending in a vertical direction to connect both the upper and lower beams 410, 420.

In the first embodiment, both the upper and lower beams 410, 420 and both the right and left supporting pillars 430 are disposed to form an approximate rectangular frame with an opening 451, and the shroud 320 is formed integrally with the panel body portion 450 to close the opening 451.

Figure 2:
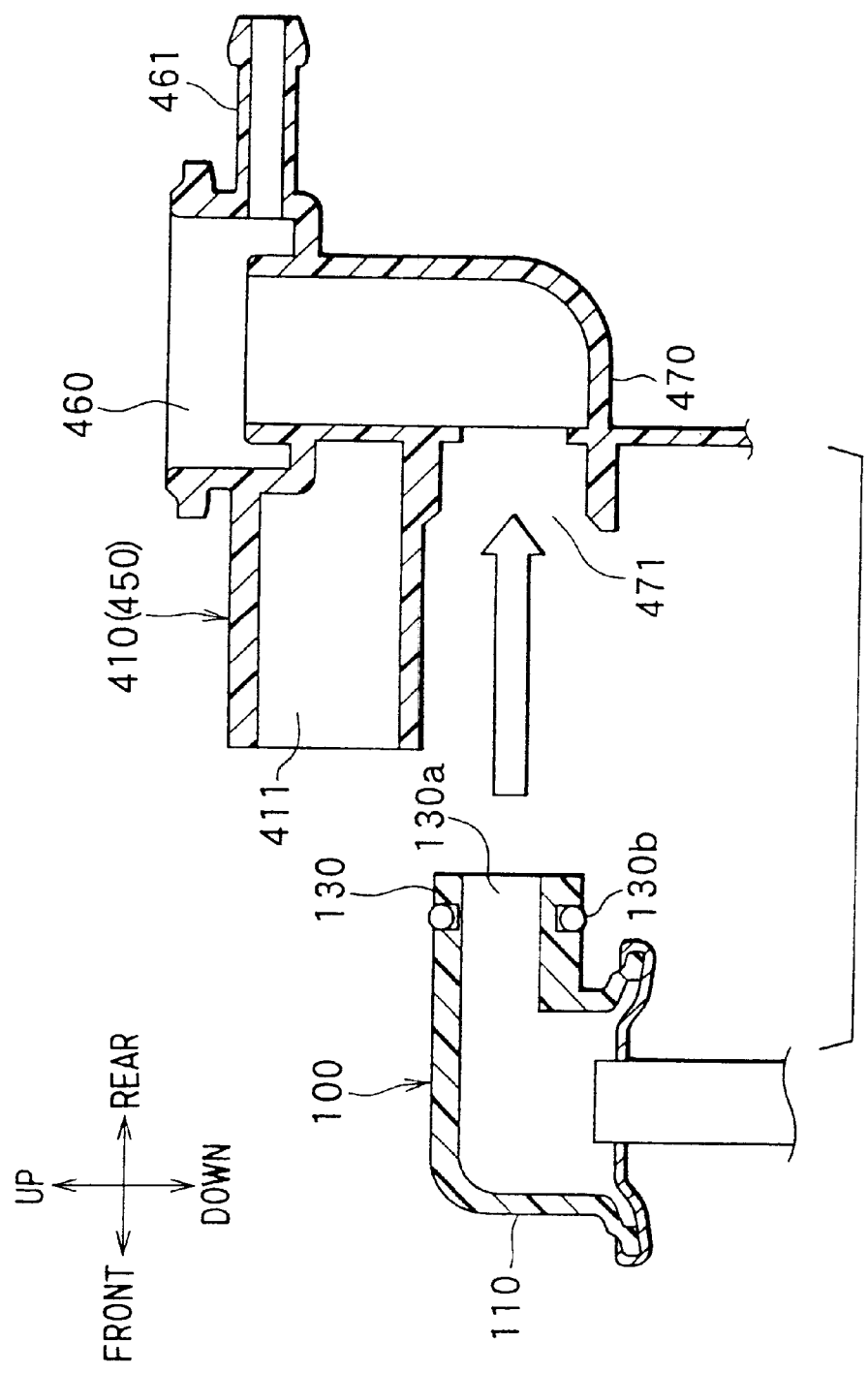
FIG. 2 is a cross-sectional view taken along line II—II in FIG. 1.

As shown in FIG. 2, a water filling port 460 for introducing coolant into the radiator 100 is integrated with a rear side part of the upper beam 410, and the water filling port 460 is coupled with the radiator 100 through the panel joint portion 470. The water filling port 460 is provided integrally with the upper beam 410 at a vehicle rear side, for a maintenance of the radiator 100. An opening 471 of the panel joint portion 470 is opened toward a vehicle front side to face with the opening 130a of the radiator joint portion 130 of the radiator 100. An O-ring 130b (seal member) made of a rubber material such as a nitrile rubber is attached to the radiator joint portion 130 of the radiator 130 so that the radiator joint portion 130 of the radiator 100 is water-tightly connected to the panel joint portion 470 through the O-ring 130b. A reserve tank (not shown) which absorb a change of an amount of coolant in the radiator 100 is connected to the water filling port 460 through a connection pipe 461.

As shown in FIG. 1, a bumper 500 (buffer member) made of a metal is covered by a bumper cover 510 made of a resin. The bumper 500 and the front end panel 400 are fixed to vehicle side bodies 600 by a fastening member such as a bolt.

Each of the upper and lower beams 410, 420 and the supporting pillars 430 of the panel body portion 450 are formed to have a U-shaped cross section opened toward a vehicle rear side. However, as shown in FIGS. 1 and 2, only at a position of the upper beam 410 of the panel body portion 450, corresponding to the water filling port 460, a U-shaped sectional part 411 opened toward a vehicle front side is formed. That is, because the water filling port 460 is provided in the upper beam 410 at a vehicle rear side position, a molding die for the upper beam 410 cannot be removed from the vehicle rear surface side at the position corresponding to the water filling port 460. Therefore, in the first embodiment, the U-shaped sectional part 411 provided at the position corresponding to the water filling port 460 is opened to the vehicle front side.

According to the first embodiment, the water filling port 460 for introducing water into the radiator 100 is integrally formed with the upper beam 410 at a vehicle rear side of the upper beam 410 of the panel body portion 450. Therefore, by connecting the radiator joint portion 130 of the radiator 100 is inserted into the opening 471 of the panel joint portion 470, the radiator 100 can be readily assembled to the panel body portion 450 of the front end panel 400.

Figure 3:
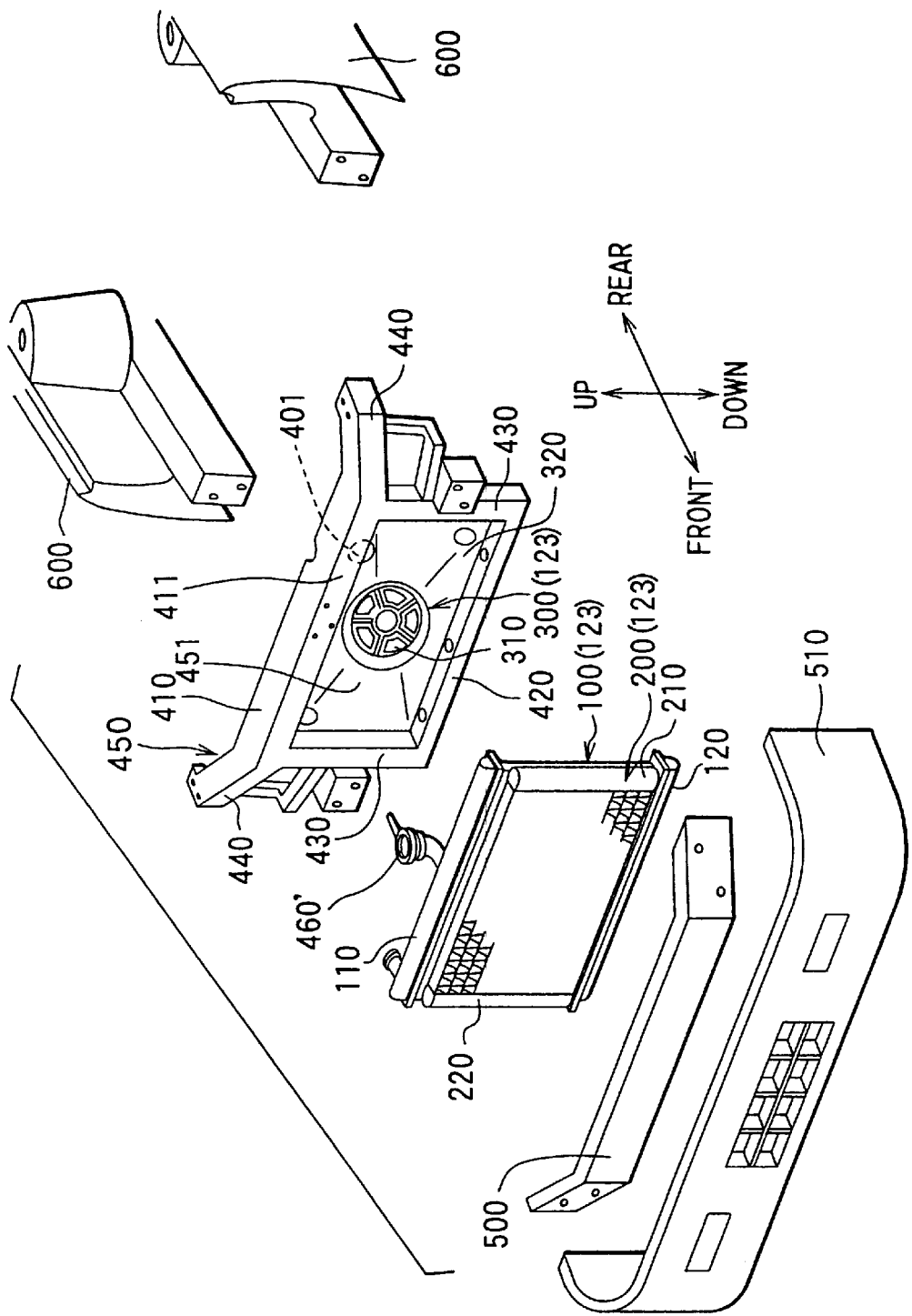
FIG. 3 is a disassembled perspective view of a vehicle front end structure according to a comparison example of the first embodiment.

In a comparison example shown in FIG. 3, a water filling pipe 460' (water filling port) is integrated with the radiator 100 at a vehicle rear side of the radiator 100, and an operation hole 401 is provided in the front end panel 400. Further, the radiator 100 is assembled to the front end panel 400 from a vehicle front side of the front end panel 400 by inserting the water filling pipe 460' into the operation hole 401 provided in the front end panel 400 to protrude to a vehicle rear side from the panel body portion 450. Therefore, in this case, it is difficult to assemble the radiator 100 to the front end panel 400.

However, according to the first embodiment of the present invention, because the water filling port 460 for introducing water into the radiator 100 is integrally formed with the upper beam 410 on the vehicle rear side of the upper beam 410 of the panel body portion 450, it is not necessary to insert a water filling pipe of the radiator 100 into an operation hole of the front end panel. Accordingly, assembling performance for assembling the radiator 100 to the front end panel 400 can be improved, assembling steps of the vehicle can be reduced, and product cost of the vehicle can be reduced.

Further, because the opening 471 of the panel joint portion 470 is opened toward the vehicle front side to face the opening 130a of the radiator joint portion 130 of the radiator 100, the radiator joint portion 130 of the radiator 100 and the panel joint portion 470 provided integrally with the panel body portion 450 of the front end panel 400 can be readily connected. As a result, the radiator 100 can be readily accurately assembled to the front end panel 400 from a vehicle front side.

Figure 4:
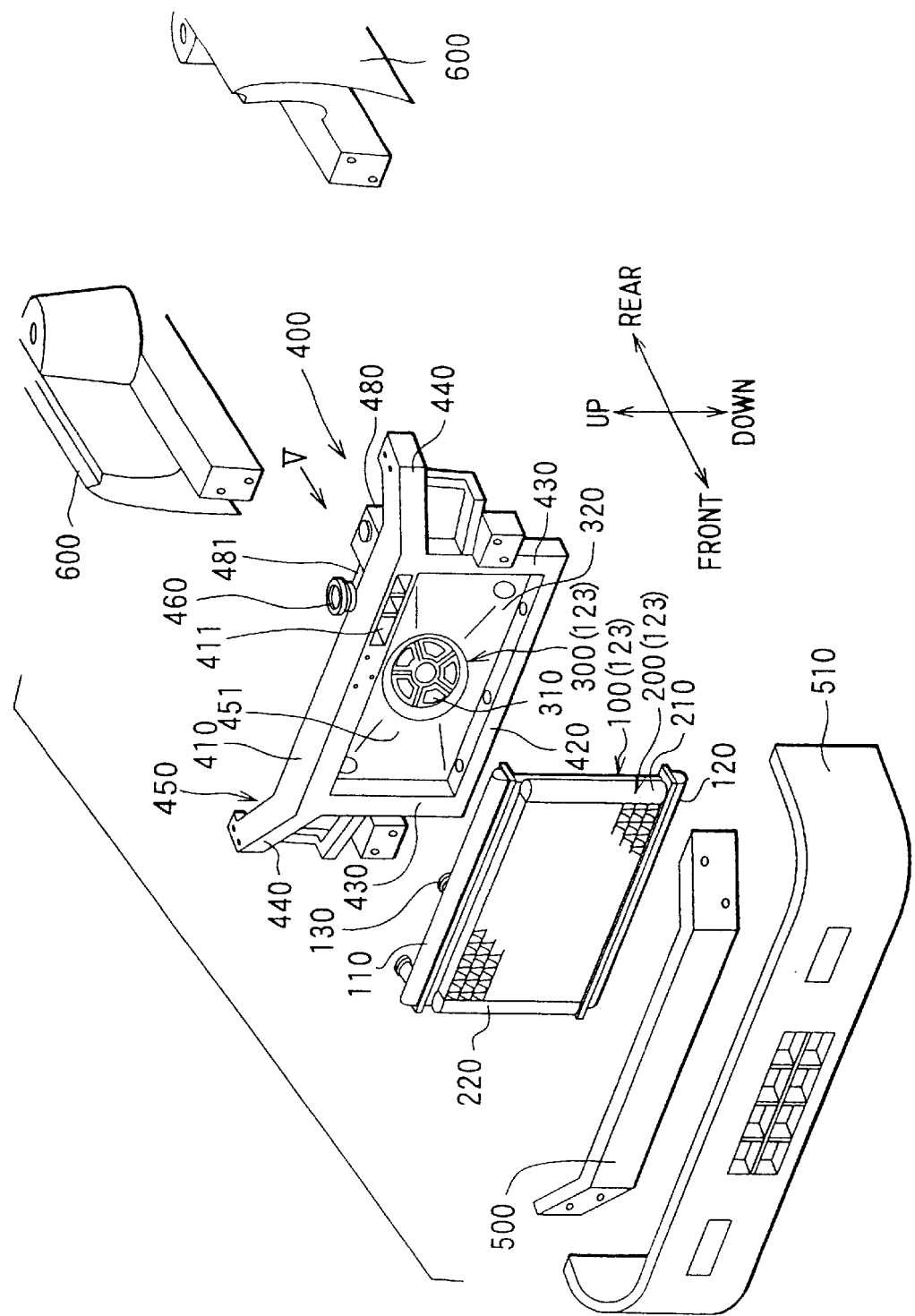
FIG. 4 is a disassembled perspective view of a vehicle front end structure with a front end panel according to a second preferred embodiment of the present invention.
Figure 5:
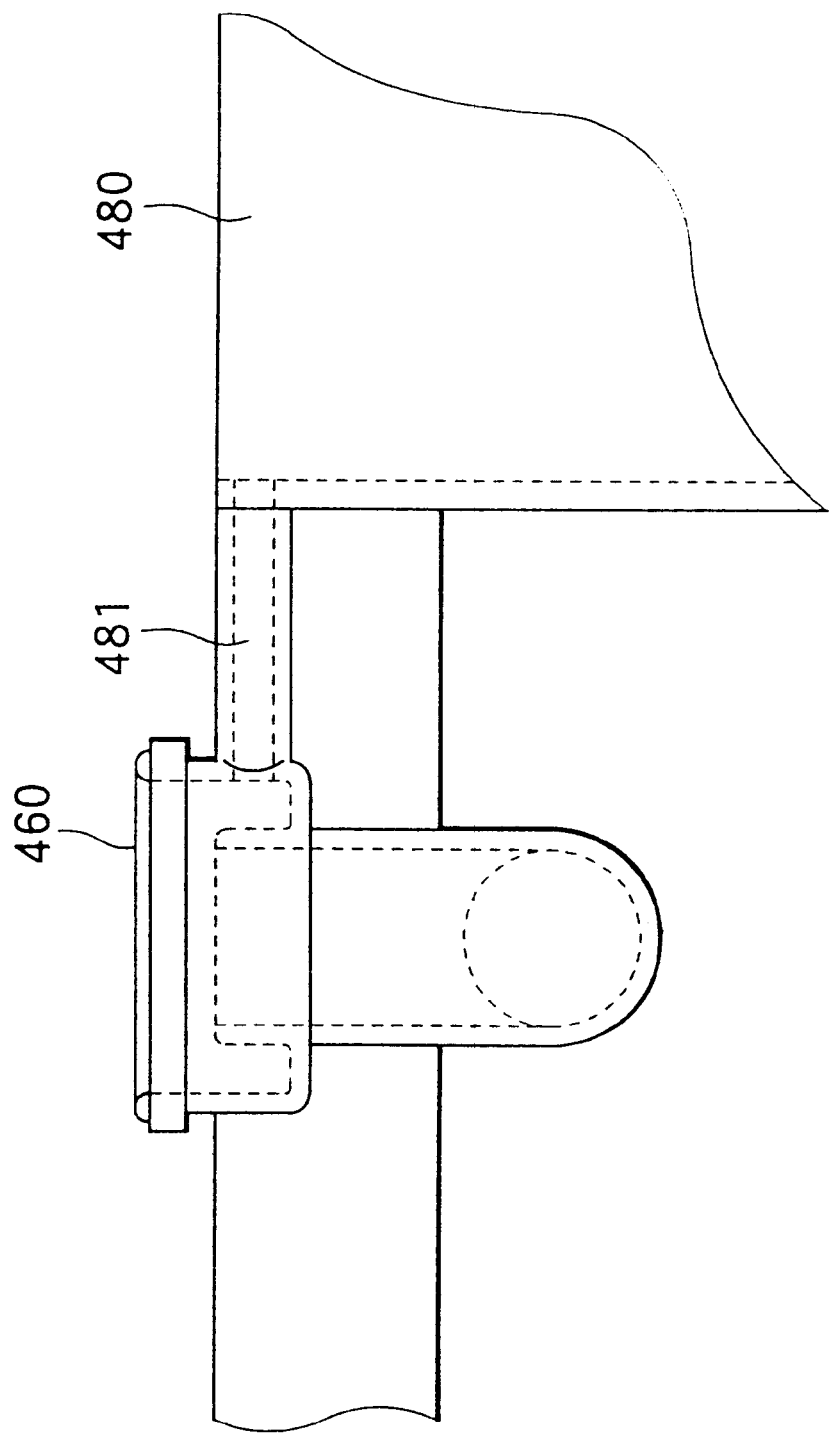
FIG. 5 is a side view when being viewed from arrow V in FIG. 4, according to the second embodiment.

A second preferred embodiment of the present invention will be now described with reference to FIGS. 4 and 5. In the second embodiment, as shown in FIGS. 4 and 5, a reserve tank 480, for absorbing a change of an amount of coolant in the radiator 100, and a communication passage 481 (communication pipe), through which the reserve tank 480 communicates with the water filling port 460, are provided integrally with the panel body portion 450 of the front end panel 400. Therefore, it is not necessary to assemble the reserve tank 480 to the front end panel 400.

Although the present invention has been fully described in connection with the preferred embodiments thereof with reference to the accompanying drawings, it is to be noted that various changes and modifications will become apparent to those skilled in the art.

For example, in the above-described embodiments, the shroud 320 is integrally formed with the panel body portion 450. However, the shroud 320 and panel body portion 450 can be integrally fastened using a fastening member such as a bolt, after being separately formed.

Such changes and modifications are to be understood as being within the scope of the present invention as defined by the appended claims.

What is claimed is:

1. A front end panel for being assembled to a vehicle, said front end panel comprising:

a panel body portion defining a water filling port said panel body portion being adapted to be directly attached to said vehicle;

a radiator attached to said panel body portion, said radiator defining an opening in communication with said water filling port; and a water tight connection disposed between said water filling port of said panel body and said opening of said radiator.

2. A front end panel being assembled to a vehicle body at a vehicle front side, comprising:

a panel body portion made of resin, to which a front end member including at least a radiator is assembled;

a water filling port, provided integrally with the panel body portion at a vehicle rear side of the panel body portion, for introducing water into the radiator;

a shroud closing at least a part of a panel rear side of the panel body portion; and a panel joint portion through which the water filling port is coupled with the radiator, the panel joint portion being provided integrally with the panel body portion at a vehicle rear side position of the panel body portion.

3. The front end panel according to claim 2, wherein the panel joint portion has an opening opened toward a vehicle front side.

4. The front end panel according to claim 3, wherein:

the radiator has a radiator joint portion being connected to the panel joint portion; and the radiator joint portion has an opening opened toward a vehicle rear side to face the opening of the panel joint portion.

5. The front end panel according to claim 4, wherein the radiator joint portion is inserted into the opening of the panel joint portion to be water-tightly connected to panel joint portion.

6. The front end panel according to claim 2, further comprising:

a reserve tank which absorbs a change of a water amount within the radiator; and a communication passage through which the reserve tank and the water filling port communicate with each other, wherein the receiver and the communication passage are formed integrally with the panel body portion.

7. The front end panel according to claim 2, wherein:

the panel body portion includes an upper beam member extending horizontally at a vehicle upper side, and a lower beam member extending horizontally at a vehicle lower side; and the water filling port and the panel joint portion are provided integrally with the upper beam member.

8. The front end panel according to claim 7, wherein the water filling port is placed above a top surface of the upper beam to protrude upwardly from the top surface of the upper beam.

9. The front end panel according to claim 8, wherein the shroud is disposed between the upper beam member and the lower beam member to close a part of a rear side space of the panel body portion between the upper beam member and the lower beam member.

10. The front end panel according to claim 2, wherein the water filling port is placed above the radiator.

11. The front end panel according to claim 2, wherein the shroud is adapted to hold a fan for blowing air toward the radiator.

12. A front end structure of a vehicle, comprising:

a front end member including at least a radiator, the front end member being mounted on the vehicle at a vehicle front side; and a front end panel being fixed to a vehicle body at a vehicle front side, to which the front end member is assembled, wherein the front end panel includes:

a panel body portion made of resin, a panel wall portion defining a water filling port for introducing water into the radiator, the panel wall portion being provided integrally with the panel body portion at a vehicle rear side of the panel body portion, a panel joint portion through which the panel wall portion is coupled with the radiator so that the water filling port communicates with the radiator;

a shroud closing at least a part of a panel rear side of the panel body portion; and a panel joint portion through which the water filling port is coupled with the radiator, the panel joint portion being provided integrally with the panel body portion at a vehicle rear side position of the panel body portion.

13. The front end structure according to claim 12, wherein:

the panel wall portion and the panel joint portion are provided integrally with the panel body portion at a vehicle rear side of the panel body portion;

the panel joint portion has an opening opened toward a vehicle front side;

the radiator has a radiator joint portion engaging with the panel joint portion; and the radiator joint portion has an opening opened toward a vehicle rear side to face the opening of the panel joint portion.

14. The front end structure according to claim 12, wherein the shroud is adapted to hold a fan for blowing air toward the radiator.

* * * * *